United States Patent
Ishibashi

(10) Patent No.: US 8,989,663 B2
(45) Date of Patent: Mar. 24, 2015

(54) PORTABLE TERMINAL SYSTEM USING A CONTACTLESS COMMUNICATION UNIT TO ENABLE ACCESS TO APPLICATION PROGRAMS

(75) Inventor: Takanobu Ishibashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/724,674

(22) Filed: Mar. 16, 2010

(65) Prior Publication Data

US 2010/0240304 A1 Sep. 23, 2010

(30) Foreign Application Priority Data

Mar. 18, 2009 (JP) .................................. 2009-067006

(51) Int. Cl.
*H04B 7/00* (2006.01)
*H04B 1/38* (2006.01)
*H04M 1/725* (2006.01)
(Continued)

(52) U.S. Cl.
CPC ........ *H04M 1/7253* (2013.01); *H04M 2250/14* (2013.01)
USPC ............. 455/41.2; 455/558; 235/382; 705/41

(58) Field of Classification Search
CPC ......................... H04M 1/7253; H04M 2250/14
USPC ................................................ 455/41.2, 41.1
See application file for complete search history.

(56) References Cited

U.S. PATENT DOCUMENTS

| 4,930,129 | A | * | 5/1990 | Takahira | 714/766 |
| 5,408,082 | A | * | 4/1995 | Takagi et al. | 235/492 |
| 6,073,062 | A | * | 6/2000 | Hoshino et al. | 701/3 |

(Continued)

FOREIGN PATENT DOCUMENTS

| EP | 1 403 761 A1 | 3/2004 |
| EP | 1 408 649 | 4/2004 |

(Continued)

OTHER PUBLICATIONS

Machine translation of Sony Corp, Okii (JP 2003-076958), "Portable Terminal Equipment, Method for Registering Functional".*

(Continued)

*Primary Examiner* — Wesley Kim
*Assistant Examiner* — Devan Sandiford
(74) *Attorney, Agent, or Firm* — Oblon, McClelland, Maier & Neustadt, L.L.P.

(57) ABSTRACT

A portable electronic apparatus that is disposed to a portable terminal device includes a contactless communication unit, the apparatus comprises a first interface which performs communication with the portable terminal device a second interface which performs contactless communication by using the contactless communication unit a storage unit which stores a plurality of application programs that execute processing in the contactless communication using the contactless communication unit through the second interface a setting unit which sets an application program capable of responding to an access request in the contactless communication in the plurality of application programs stored in the storage unit and a processing unit by which the application program enabled to respond to the access request in the contactless communication by the setting unit alone responds upon receiving the access request in the contactless communication through the second interface.

9 Claims, 5 Drawing Sheets

(51) Int. Cl.
*G06K 5/00* (2006.01)
*G06Q 40/00* (2012.01)

(56) References Cited

U.S. PATENT DOCUMENTS

| | | | | |
|---|---|---|---|---|
| 2001/0040185 A1* | 11/2001 | Takiguchi et al. | ............ | 235/451 |
| 2002/0043565 A1* | 4/2002 | Hoshino et al. | ............... | 235/492 |
| 2002/0076051 A1* | 6/2002 | Nii | ................................ | 380/232 |
| 2002/0139861 A1* | 10/2002 | Matsumoto et al. | .......... | 235/492 |
| 2003/0174839 A1* | 9/2003 | Yamagata et al. | ............ | 380/270 |
| 2004/0050932 A1* | 3/2004 | Fukada et al. | ................. | 235/380 |
| 2007/0213041 A1* | 9/2007 | Horie | ............................. | 455/419 |
| 2008/0277482 A1 | 11/2008 | Parlange et al. | | |
| 2011/0009091 A1* | 1/2011 | Aoki | ............................. | 455/410 |

FOREIGN PATENT DOCUMENTS

| | | |
|---|---|---|
| JP | 2003-044801 A | 2/2003 |
| JP | 2003-076958 A | 3/2003 |
| JP | 2003076958 A * | 3/2003 ............. G06K 17/00 |
| JP | 2004-207757 | 7/2004 |
| JP | 2005-182128 A | 7/2005 |
| JP | 2006-012026 A | 1/2006 |
| JP | 2006-119946 | 5/2006 |
| JP | 2007-282196 A | 10/2007 |
| WO | WO 2008/091065 | 7/2008 |
| WO | WO 2008/107437 | 9/2008 |

OTHER PUBLICATIONS

European Search Report dated Sep. 28, 2010.
First Office Action (with English Language Translation), issued by Japanese Patent Office on Sep. 18, 2012, in corresponding JP Patent Application No. 2009-067006.
European Search Report dated Nov. 30, 2012.
Japanese Office Action dated Feb. 19, 2013.

* cited by examiner

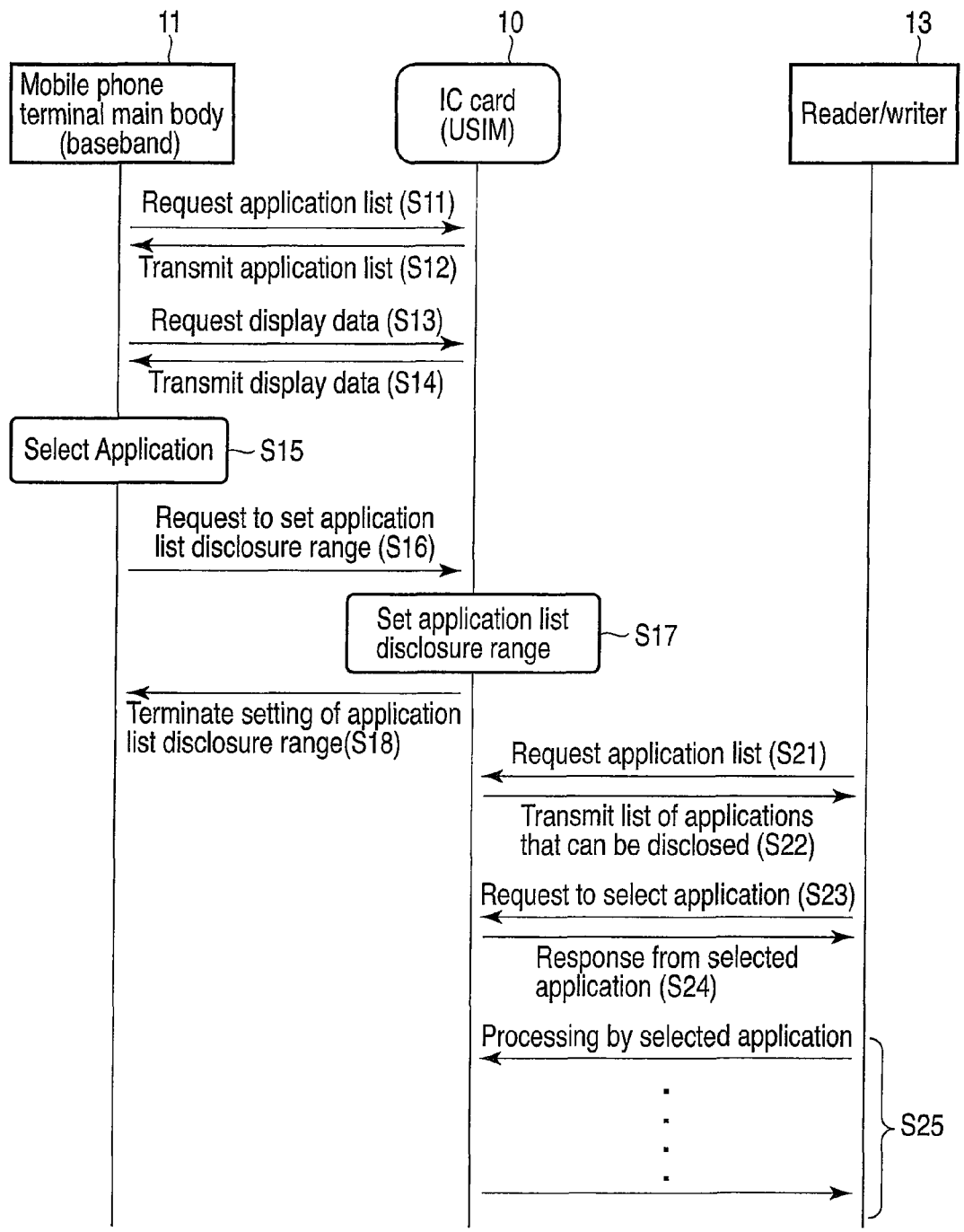
F I G. 9

PORTABLE TERMINAL SYSTEM USING A CONTACTLESS COMMUNICATION UNIT TO ENABLE ACCESS TO APPLICATION PROGRAMS

CROSS-REFERENCE TO RELATED APPLICATIONS

This application is based upon and claims the benefit of priority from prior Japanese Patent Application No. 2009-067006, filed Mar. 18, 2009, the entire contents of which are incorporated herein by reference.

BACKGROUND OF THE INVENTION

1. Field of the Invention

The present invention relates to a portable electronic apparatus such as an IC card that can execute a plurality of applications for communication with an external device based on a communication scheme of a contactless IC card and to a portable terminal system such as a mobile phone terminal having an IC card attached thereto.

2. Description of the Related Art

In many countries such as those in Europe and other parts of the world, a GSM (Global System for Mobile communications) scheme has been conventionally present as a mobile phone system scheme. In the GSM scheme, an SIM (Subscriber Identity Module) card that is one kind of IC cards must be disposed in a mobile phone terminal. In Japan, a mobile phone system adopting a PDC (Personal Digital Cellular) scheme which does not require the SIM card has been present. In areas such as Japan or Europe, a mobile phone system adopting a 3GPP (3rd Generation Partnership Project) standard has recently become widespread. In regard to the 3GPP standard, an IC card that is called a USIM (Universal Subscriber Identity Module) card must be disposed in a mobile phone terminal like a SIM card.

The SIM card or the USIM card used in the GSM or 3GPP is an IC card that is disposed in a mobile phone terminal. In the SIM card or the USIM card, information such as key information required for connection with a portable communication system, a cryptographic algorithm, various kinds of network parameters or personal information of a user is recorded. In such a mobile phone terminal, information stored in the SIM card or the USIM cared is transmitted to an OTA (Over The Air) server or an authentication server of a telecommunication firm to perform authentication with such a server. A mobile phone terminal that has succeeded in authentication with the server can accept a communication service from the telecommunication firm.

In particular, various applications provided by each telecommunication firm are stored in the USIM used for the mobile phone terminal based on the 3GPP standard. Further, it is often the case that the USIM stores unique information customized in accordance with each user. Furthermore, in recent years, development of a USIM having a large-capacity memory has advanced. In the USIM having a large-capacity memory, a user region in the memory can be expanded. For example, it is often the case that personal information such as information in an address book stored in an internal memory of a mobile phone terminal or an external memory (e.g., a memory card) disposed in a mobile phone terminal is stored in the highly secure USIM.

The number of types of mobile phone terminals based on the 3GPP standard having the USIM attached thereto that is capable of international roaming is increased to be used overseas. When performing the international roaming, a method of removing the USIM from the mobile phone terminal based on the 3GPP and newly inserting the USIM into a mobile phone terminal that can be used in the GSM is general. Moreover, in recent years, mobile phones that can be used in both the 3GPP and the GSM has come onto the market, and 3GPP networks have spreading overseas. As described above, since mobile phone services presently have become seamless, enabling use of applications which are utilized in mobile phone terminals from both home and abroad has been demanded.

On the other hand, in recent years, the number of mobile phone terminals having interfaces conforming to a communication standard ISO/IEC14443 for contactless IC cards is increasing. It is assumed that such mobile phone terminals are utilized in various operating conformations. The mobile phone terminal having the contactless IC card function can be utilized as a contactless IC card or a contactless IC card reader/writer. For example, functions of the contactless IC card installed in the mobile phone terminal are utilized for, e.g., a payment transaction using credit card type or prepaid type electronic money in some cases. Such processing based on the contactless IC card function is realized by an application program stored in the mobile phone terminal main body or the USIM.

However, the application program that realizes various kinds of processing based on the contactless IC card function (which may be also referred to as a contactless IC card application hereinafter) often has an operating conformation that recommends installing this program in the USIM while considering security properties and portability. When a plurality of contactless IC card applications are installed in the USIM, a contactless IC card application to be used must be selected. Additionally, in the above-described operating conformation, contactless IC card applications that are not allowed to coexist in one contactless IC card in terms of business or contactless IC card applications that execute similar processing are present in one USIM.

When a plurality of contactless IC card applications are installed in the USIM in this manner, a contactless IC card application to be used must be selected by a reader/writer (a host device). In this case, the reader/writer requires a processing procedure for selecting a desired contactless IC card application, the processing requires time.

BRIEF SUMMARY OF THE INVENTION

One aspect of the present invention is intended to provide a portable electronic apparatus and a portable terminal system which enable effective selection of an application program complying with a predetermined condition from among a plurality of application programs.

According to an aspect of the present invention, there is provided a portable electronic apparatus that is disposed to a portable terminal device comprising a contactless communication unit, the apparatus comprising a first interface which performs communication with the portable terminal device, a second interface which performs contactless communication by using the contactless communication unit, a storage unit which stores a plurality of application programs that execute processing in the contactless communication using the contactless communication unit through the second interface, a setting unit which sets an application program capable of responding to an access request in the contactless communication in the plurality of application programs stored in the storage unit, and a processing unit by which the application program enabled to respond to the access request in the contactless communication by the setting unit alone responds upon receiving the access request in the contactless communication through the second interface.

According to an aspect of the present invention, there is provided a portable terminal system comprising a portable terminal device and a portable electronic apparatus, the portable terminal device comprises a portable electronic apparatus interface to which the portable electronic apparatus is disposed, a control unit which performs data communication with the portable electronic apparatus through the portable electronic apparatus interface, and a contactless communication unit which is connected with the portable electronic apparatus through the portable electronic apparatus interface and performs contactless communication, and the portable electronic apparatus comprises a first interface which is configured to perform communication with a control unit of the portable terminal device, a second interface which is configured to achieve connection with the contactless communication unit, a storage unit which stores a plurality of application programs that perform processing in contactless communication using the contactless communication unit through the second interface, a setting unit which enables an application program to respond to an access request in the contactless communication in the plurality of application programs stored in the storage unit, and a processing unit by which the application program enabled to respond to the access request in the contactless communication by the setting unit alone responds upon receiving the access request in the contactless communication through the second interface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a flowchart for explaining a flow of processing performed by the contactless IC card application.

DETAILED DESCRIPTION OF THE INVENTION

The best mode for carrying out the present invention will now be described hereinafter with reference to the drawings.

Figure 1:
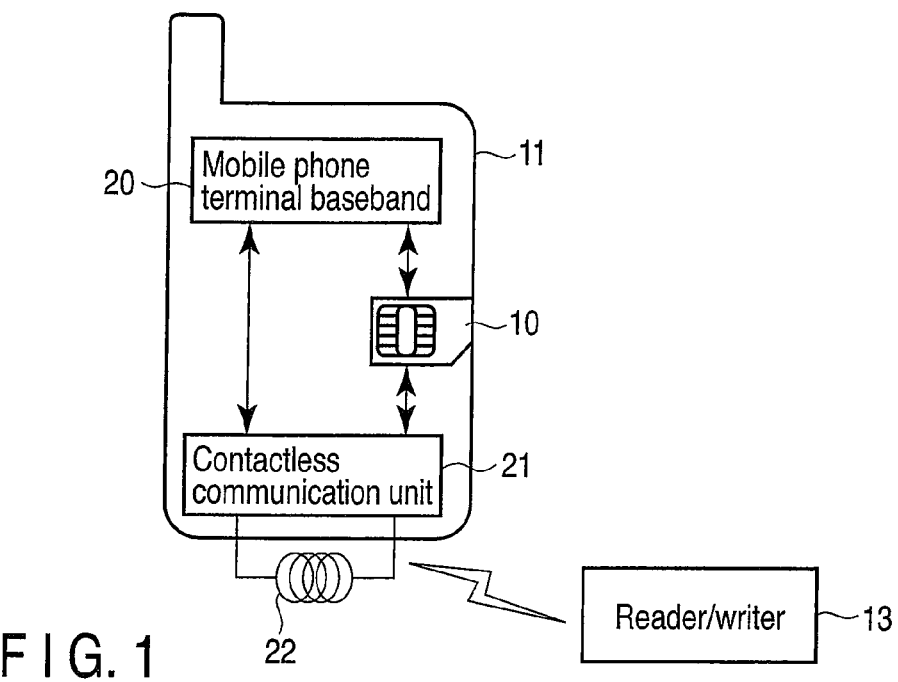
FIG. 1 is a view schematically showing a configuration of a mobile phone terminal as a portable terminal device to which an IC card according to an embodiment is attached.

FIG. 1 is a view for schematically showing a configuration of a mobile phone terminal 11 as a portable terminal device to which an IC card 10 according to an embodiment of the present invention is applied.

The mobile phone terminal 11 as a portable terminal device according to this embodiment has a function of receiving a communication service (wireless communication such as voice call or data communication) provided by a communication system of a wireless communication firm. The communication service is provided by the firm when the mobile phone terminal 11 having the IC card 10 for the firm attached thereto and the communication system of the firm perform wireless communication. That is, each mobile phone terminal 11 can utilize wireless communication, e.g., voice call or data communication as the mobile phone terminal with the IC card 10 for the firm to which each user has subscribed being attached thereto.

The mobile phone terminal 11 has a control unit (a baseband) 20, a contactless communication unit 21, a contactless communication antenna 22 and others. Further, the mobile phone terminal 11 has an interface to/from which the IC card 10 can be attached/detached. As described above, when the IC card 10 is attached to the mobile phone terminal 11, various functions as the mobile phone terminal become effective.

The control unit 20 controls the mobile phone terminal 11. The control unit 20 has various processing units that allow the mobile phone terminal 11 to function as a mobile phone. It is to be noted that a structural example in the control unit 20 will be described later in detail.

The contactless communication unit 21 and the antenna 22 are units that realize a communicating function as a contactless IC card. As shown in FIG. 1, the contactless communication unit 21 and the antenna 22 can perform contactless communication with a contactless communication reader/writer 13 based on a communicating function as the contactless IC card. It is to be noted that the communicating function exercised by the contactless communication unit 21 and the antenna 22 will be also explained later in detail.

A configuration of the mobile phone terminal 11 will now be described in detail.

Figure 2:
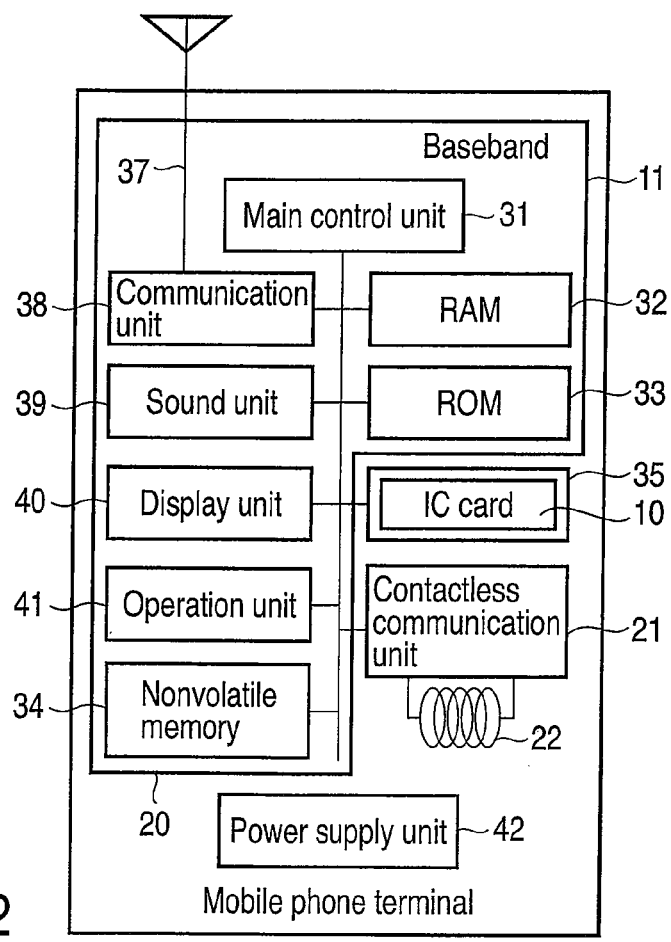
FIG. 2 is a block diagram showing a structural view of the mobile phone terminal.

FIG. 2 is a block diagram showing a structural example of the mobile phone terminal 11.

As shown in FIG. 2, the mobile phone terminal 11 has a main control unit 31, an RAM 32, an ROM 33, a nonvolatile memory 34, an IC card interface 35, a contactless communication unit 21, an antenna 22, an antenna 37, a communication unit 38, a sound unit 39, a display unit 40, an operation unit 41, a power supply unit 42 and others.

The main control unit 31 controls the respective units in the mobile phone terminal 11. The main control unit 31 has a CPU, an internal memory, various kinds of interfaces and others. The main control unit 31 is connected with the respective units through the various kinds of interfaces and others. For example, the main control unit 31 has functions such as a display control function of controlling display in the display unit 40, a PLL (Phase Locked Loop) circuit, data stream path switching, a DMA (Direct Memory Access) controller, an interrupt controller, a timer, a UART (Universal Asynchronous Receiver Transmitter), secrecy, HDLC (High-level Data Link Control procedure) framing, a device controller and others as basic functions.

The RAM 32 is a volatile memory that stores work data. The ROM 33 is a nonvolatile memory that stores a control program or control data. The ROM 33 is a nonvolatile memory. For example, the ROM 33 previously stores a control program or control data required to execute basic control over the mobile phone terminal 11. That is, the main control unit 31 executes the control program stored in the ROM 33 to realize basic control over the mobile phone terminal 11.

The nonvolatile memory 34 is a nonvolatile memory in which various kinds of data can be rewritten. The nonvolatile memory 34 stores various kinds of application programs for the mobile phone terminal 11, control data, user data and others. For example, when the main control unit 31 executes the application programs stored in the nonvolatile memory 34, various functions as a mobile phone can be realized.

The IC card interface 35 is an interface to which the IC card 10 is attached. The IC card interface 35 is connected with the main control unit 31. As a result, the control unit 20 can perform data communication (contact communication) with the IC card 10 through the IC card interface 35. Furthermore, the IC card 10 that is attached to the IC card interface 35 is connected with the contactless communication unit 21 through the IC card interface 35, thereby realizing a function of communicating with the reader/writer 13 based on contactless communication using the contactless communication unit 21 and the antenna 22 without utilizing the control unit 20.

The contactless communication unit 21 is connected with the contactless communication antenna 22. The contactless communication unit 21 executes contactless communication with the reader/writer 13 through the contactless communication antenna 22. The contactless communication performed by the contactless communication unit 21 and the antenna 22 is determined to be wireless communication equivalent to that of a contactless IC card. That is, the contactless communication unit 21 and the antenna 22 carry out contactless communication with the reader/writer 13 that has entered a connected state based on electromagnetic coupling. Furthermore, the contactless communication unit 21 and the antenna 22 perform communication by repeatedly transmitting and receiving predetermined commands and responses with respect to the reader/writer 13 like a contactless IC card.

The communication unit 38 is connected with the mobile phone communication antenna 37. The communication unit 38 transmits/receives call data or data for data communication by using electric waves via the antenna 37. The sound unit 39 has an analog front end unit and an audio unit and inputs/outputs sound. The sound unit 39 is connected with a speaker, a receiver, a microphone and others which are not shown.

The display unit 40 is formed of, e.g., a display control unit. The display unit 40 is connected with a display device such as a liquid crystal display device. The display unit 40 controls display contents based on control over the main control unit 31. Additionally, when the mobile phone terminal 11 has, e.g., a shell-like shape, the display unit 40 may be formed of a main display unit that appears when a housing is opened and a sub-display unit provided on a rear surface of the housing. The operation unit 41 is constituted of an operation device such as an operation unit interface and a keyboard. The operation unit 41 receives operating instructions issued by a user.

The power supply unit 42 is constituted of, e.g., a battery and supplies power to the respective units in the mobile phone terminal 11. Additionally, the power supply unit 42 may supply power to the IC card 10 and the contactless communication unit 21 connected through the IC card interface 35.

A configuration of the IC card 10 as a portable electronic apparatus that is attached to the mobile phone terminal 11 as a portable terminal device will now be described.

The IC card 10 is configured to be attachable/detachable to/from the mobile phone terminal 11 as the portable terminal device. The IC card 10 satisfies, e.g., an ISO/IEC7816 specification, an ISO/IEC14443 specification or a specification defined by ETSI as a basic specification.

Figure 3:
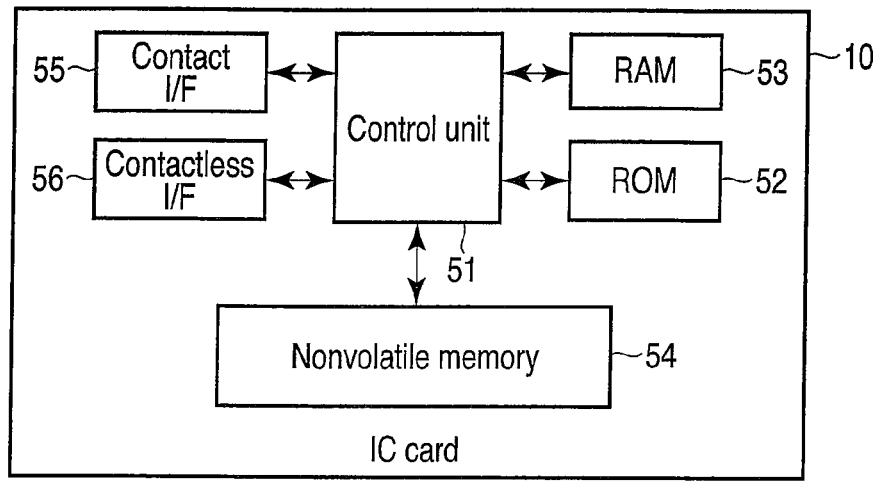
FIG. 3 is a block diagram showing a structural example of hardware of the IC card.

FIG. 3 is a block diagram showing a hardware structural example of the IC card 10. As shown in FIG. 3, the IC card 10 has a control unit 61, an ROM 52, an RAM 53, a nonvolatile memory 54, a contact interface (I/F) 55, a contactless interface (I/F) 56 and others.

The control unit 51 controls the entire IC card 10. The control unit 51 realizes a variety of functions by executing various kinds of functions based on programs recorded in the ROM 52 the nonvolatile memory 54. The ROM 52 records a control program and control data required to realize basic operations of the IC card. The RAM 53 functions as a working memory that temporarily stores data.

The nonvolatile memory 54 is formed of, e.g., an EEPROM or a flash memory. The nonvolatile memory 54 stores various kinds of authentication data and user data, an application program (which may be also simply referred to as an application hereinafter) and others. The nonvolatile memory 54 also stores data downloaded from an external server. Part or all of a region in the nonvolatile memory 54 has tamper-resisting properties. As a result, the nonvolatile memory 54 can securely store data. The interface 55 is a unit that performs communication with the mobile phone terminal 11.

Furthermore, the nonvolatile memory 54 having the tamper-resisting properties securely stores an application program, a data base and others. For example, the nonvolatile memory 54 stores an authentication processing application, a contactless IC card application, a database and others. The control unit 51 executes processing based on each application by operating each application on an operating system (OS).

The contact interface 55 functions as a first interface that achieves contact communication with the mobile phone terminal 11. The contact interface 55 is an interface that is connected with the mobile phone terminal baseband 20 as a control unit of the mobile phone terminal 11 main body through the IC card interface 35 of the mobile phone terminal 11. That is, the IC card 10 is accessed by the mobile phone terminal 11 main body through the contact interface 55.

The contactless interface 56 functions as a second interface that achieves contactless communication as the same wireless communication function as the contactless IC card by using the contactless communication unit 21 in the mobile phone terminal 11. The contactless interface 56 is an interface that achieves connection with the contactless communication unit 21 in the mobile phone terminal 11 via the IC card interface 35 in the mobile phone terminal 11. The IC card 10 is configured to function as a contactless IC card by the contactless communication unit 21 of the mobile phone terminal 11 connected through the contactless interface 56 and the antenna 22.

It is to be noted that, in the IC card 10, a third interface may be provided in addition to the contact I/F 55 and the contactless I/F 56. For example, as the third interface, a USB interface or the like can be assumed. In this case, it is possible to realize an operating conformation that a device connected with a USB terminal provided on the mobile phone terminal 11 side through the USB interface directly communicates with the IC card 10.

An operation of each application program in the IC card 10 will now be roughly described.

Figure 4:
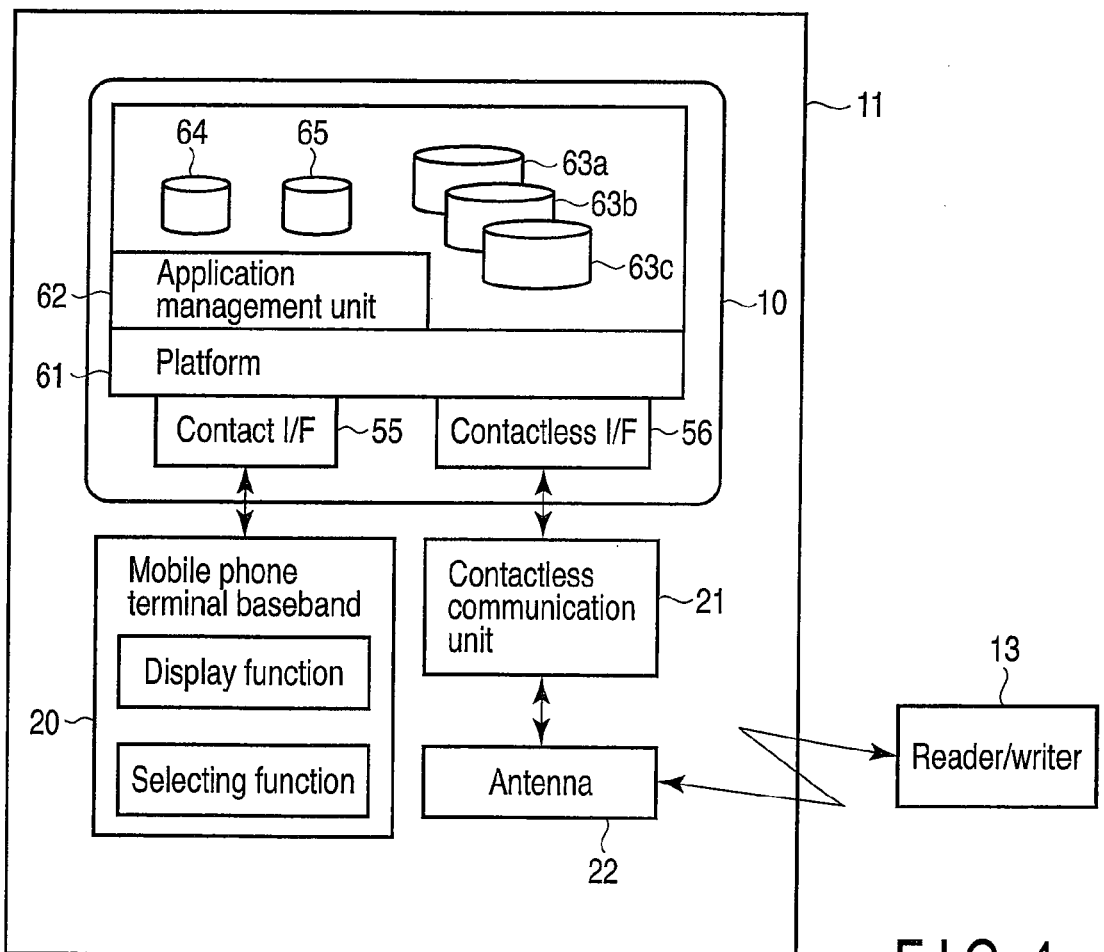
FIG. 4 is a view for explaining a processing function exercised by an application program in the IC card.

FIG. 4 is a view for explaining a processing function achieved by each application program in the IC card 10.

As shown in FIG. 4, the IC card 10 is realized by the contact I/F 55, the contactless I/F 56, a platform 61, an application management unit 62, a plurality of application programs 63a, 63b and 63c, an application list 64 and others as a system that realizes various kinds of processing (services) as the contactless IC card. Further, when display data such as a pattern or text data indicative of an application must be displayed, this display data is stored in a display data DB 65. Furthermore, in the structural example shown in FIG. 4, a hierarchical level including the contact I/F 55 and the contactless I/F 56 can be represented as an H/W layer, a hierarchical level including the platform can be represented as OS layer, and a hierarchical level including the plurality of application programs, the application list and the display data can be represented as a model.

As depicted in FIG. 4, the IC card 10 supports at least two communication interfaces, i.e., the contact interface 55 as the first interface and the contactless interface 56 as the second interface. The contact interface 55 is connected with the baseband 20 of the mobile phone terminal 11. As a result, the contact interface 55 handles a signal from the baseband 20 of the mobile phone terminal 11. The contactless interface 56 is connected with the contactless communication unit 21. As a result, the contactless interface 56 handles a signal from the contactless communication unit 21.

The platform 61 is a function for executing basic control in the IC card 10. The platform 61 is realized by, e.g., an OS (operating system) program executed by the control unit 51. Furthermore, the platform 61 may have a module such as an environment setting module or an application interface group. Software as the platform is a program that controls basic operations of the IC card 10. Software as the platform is a program that controls various kinds of hardware or operates upon receiving information such as a processing result from various kinds of hardware. Software as the platform 61 is stored in the nonvolatile memory in the IC card 10 in advance. Software as the platform 61 is stored in, e.g., the ROM 52 or the nonvolatile memory 54.

The application management unit 62 is a function that manages each application program. The application management unit 62 is realized by an application management program executed by the control unit 51, for example. Software as the application management unit 62 is stored in the nonvolatile memory in the IC card 10 in advance. Software as the application management unit 62 is stored in, e.g., the ROM 52 or the nonvolatile memory 54.

The respective application programs 63a, 63b and 63c are various functions provided (stored) by the IC card 10 using the mobile phone terminal 11. Here, the respective application programs 63a, 63b and 63c are determined to be application programs (which will be also referred to as contactless IC card applications) that realize various services using functions of the contactless IC card (contactless communication using the contactless communication unit 21 and the antenna 22) installed in this mobile phone terminal 11. The respective application programs 63a, 63b and 63c are selectively executed by the control unit 51, for example. The respective application programs 63a, 63b and 63c are stored in the nonvolatile memory in the IC card 10. For example, the respective application programs 63a, 63b and 63c are stored in the nonvolatile memory 54 or the ROM 52.

As the contactless IC card application, various applications such as an application (a payment application) that performs a payment transaction as credit card type or prepaid type electronic money based on contactless communication (a communication scheme of the contactless IC card), an application that functions as a certificate for receiving, e.g., specific services (membership services) such as utilization of facilities based on contactless communication, or an application that gives points according to actual achievement such as purchase of commodities or utilization of services based on contactless communication can be considered.

For example, the payment application as the contactless IC card application carries out a payment transaction as credit card type or prepaid type electronic money based on contactless communication. The payment transaction effected by the payment application is used by a person who owns the mobile phone terminal 11 having the IC card 10 attached thereto (a user of the IC card) for payment of payment for purchase of commodities or the like. For example, the payment application is activated in response to a command supplied from the reader/writer 13. When authentication based on predetermined authentication processing has succeeded, the payment application executed by the control unit 51 performs the payment transaction when the contactless communication unit 21 of the mobile phone terminal 11 and the reader/writer 13 perform contactless communication.

The application list 64 is information indicative of setting contents for each application program stored (installed) in the IC card 10. In the example depicted in FIG. 4, the application list 64 is information indicative of a list of the respective application programs 63a, 63b and 63c. A structural example of the application list 64 will be described later in detail.

Further, the application list 64 is stored in the nonvolatile memory 54. The application list 64 may be updated in the nonvolatile memory 54 or may be read to the RAM 53 and updated in the RAM 53 when the IC card 10 is activated. In an operating conformation that the application list 64 is updated in the nonvolatile memory 54, updated contents of the application list 64 are held even though the IC card 10 is inactivated (the power supply of the IC card 10 is turned off). As a result, the once updated contents are effective even when the IC card 10 is again activated.

Furthermore, in an operating conformation that the application list 64 read to the RAM 53 is updated, the updated contents of the application list 64 are erased when the IC card 10 is inactivated. That is, in a conformation that the application list 64 read to the RAM 53 is updated when the IC card 10 is activated, updated contents are effective during a period from activation to inactivation of the IC card 10, and the application list 64 is reset when the IC card 10 is again activated (restarted).

The display data DB 65 stores display data associated with each of the application programs 63a, 63b and 63c. That is, in a section screen where a user selects a specific application program, display data associated with each application program is displayed in the display unit of the mobile phone terminal 11. Therefore, as the display data, a pattern, text data or a mark that facilitates a user's intuitive recognition of a service provided by each corresponding application program is set.

The application program 63 and the display data DB 65 that are installed in the IC card 10 may differ in accordance with each user. However, the application list 64 is installed in the IC cards 10 of all users. It is to be noted that an application concerning authentication processing or authentication data is not illustrated in the structural example depicted in FIG. 4. Usually, the nonvolatile memory 54 in the IC card 10 stores the plurality of application programs 63a, 63b and 63c, the application list 64, the display data DB 65 as well as applications such as an application used for authentication processing and various kinds of data. Such applications and data are not depicted in FIG. 4.

Furthermore, the mobile phone terminal baseband 20 is a control unit that performs control functions as a mobile phone of the mobile phone terminal 11. For example, the mobile phone terminal baseband 20 has a display function and a selecting function as depicted in FIG. 4. For example, as the display function, the baseband 20 has a function of displaying display data associated with each application program 63 in the display unit 40. As the selecting function, it has a function of allowing a user to select an application program associated with the display data displayed based on the display function by using the operation unit 41.

An operation of the application program installed in this IC card 10 will now be roughly described.

First, the mobile phone terminal baseband (a control unit) 20 requests the IC card 10 to supply the application list 64. In response to this request, the IC card 10 supplies the application list 64 to the control unit 20 of the mobile phone terminal 11. As a result, the control unit 20 of the mobile phone terminal 11 acquires the application list 64 indicative of application IDs (AIDs) of contactless IC card applications installed in the IC card 10.

Upon acquiring the application list 64 from the IC card 10, the control unit 20 requests the IC card 10 to supply display data associated with each application (AID). In response to this request, the IC card 10 supplies the display data to the mobile phone terminal baseband 20. As a result, the control unit 20 of the mobile phone terminal acquires the display data associated with each contactless IC card application installed in the IC card 10.

Upon receiving the display data associated with each AID in the obtained application list 64, the control unit 20 of the mobile phone terminal displays the display data by using the display function based on the acquired display data. A user utilizes the selecting function to select the display data displayed based on the display function. When the user selects one piece of display data based on the selecting function, the control unit 20 of the mobile phone terminal sets a range of the application list in which an application associated with the selected display data can be disclosed (referred to from the contactless interface 56) as a function of the contactless IC card.

For example, when the application 63a is selected, the control unit 20 of the mobile phone terminal sets the application 63a alone as a range of the application list that this application can be disclosed as the contactless IC card. When the IC card 10 in which such a configuration is set is accessed from the reader/writer 13 through the contactless communication unit, the application 63a alone is disclosed as the application list. Therefore, the service as the contactless IC card using the application 63a can be provided by the simple operation on the reader/writer 13 side.

A structural example of the application list 64 will now be described.

Figure 5:
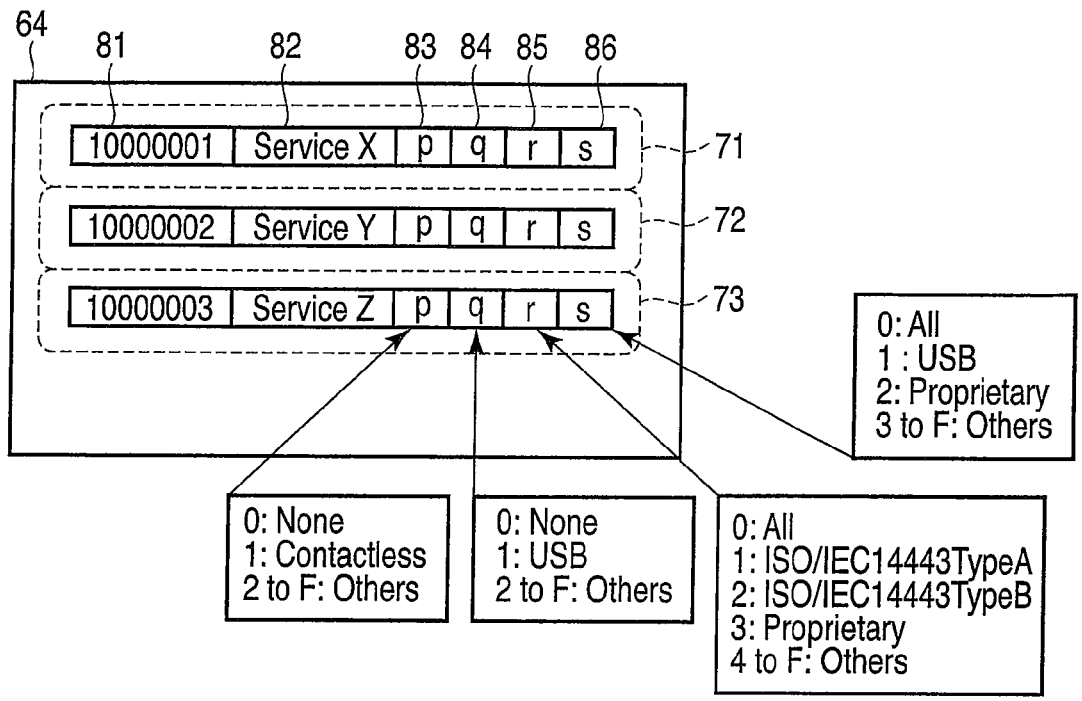
FIG. 5 is a view showing a structural example in an application list.

FIG. 5 is a view showing a structural example in the application list 64.

In the structural example depicted in FIG. 5, the application list 64 includes data strings 71, 72 and 73 for the respective application programs. Each of the data strings 71, 72 and 73 for the respective application programs includes an application ID (AID) 81, an application name (data) 82, a first parameter 83, a second parameter 84, a third parameter 85 and a fourth parameter 86.

The application ID 81 is ID information as identification information intrinsic to a corresponding application program. The application name 82 is a name or intrinsic data given to a corresponding application program. Each of the first to fourth parameters 83 to 86 is an information group indicative of a setting situation of a corresponding application program. Each of the first to fourth parameters 83 to 86 is information represented by approximately two to four bits in the example in FIG. 5.

Each of the first parameter 83 and the second parameter 84 stores information indicative of an interface through which each application can be disclosed with respect to access. In other words, based on information set in each of the first parameter 83 and the second parameter 84, an interface through which reference can be made to each application is set. It is to be noted that all application programs (contactless IC card applications) can be disclosed (referred to) in response to access from the contact interface 55. That is, the entire application list 64 indicative of all application programs (contactless IC card applications) is disclosed with respect to access from the contact interface 55.

The first parameter 83 stores information indicating whether disclosure is possible with respect to access from the contactless interface 56. For instance, in the example depicted in FIG. 5, each application program enables disclosure (reference) in response to an access request from the contactless interface 56 when the first parameter 83 is "1", and it disables disclosure (disables reference) in response to an access request from the contactless interface 56 when the first parameter 83 is "0".

Moreover, the second parameter 84 stores information indicating whether disclosure is possible with respect to access from a third interface other than the contact I/F 55 and the contactless I/F 56. For example, as shown in FIG. 5, as an example of the third interface, a USB interface or the like can be considered. In this case, each application program can be disclosed (referred to) in response to an access request from the USB interface when the second parameter 84 is "1", and it cannot be disclosed (cannot be referred to) in response to an access request from the USB interface when the second parameter is "0".

Each of the third parameter 85 and the fourth parameter 86 stores information indicative of a communication protocol that enables disclosure of each application with respect to access. In other words, based on information set in each of the third parameter 85 and the fourth parameter 86, a communication protocol that enables making reference to each application is set.

For example, the third parameter 85 stores information indicative of a type of communication protocol that enables disclosure of each application program in response to access in contactless communication using the contactless interface 56. However, the third parameter 85 is substantially effective only when the setting in the first parameter 83 is "1" (i.e., disclosure is enabled through the contactless I/F 56). In other words, since disclosure using the contactless I/F 56 is impossible when the setting in the first parameter 83 is "0", setting contents in the third parameter 85 are substantially ineffective.

For instance, in the example depicted in FIG. 5, each application program can be disclosed (referred to) in communication based on all communication protocols when the third parameter 85 is "0", and it can be disclosed (referred to) in communication based on a type A (type A defined in ISO/IEC14443) communication protocol when the third parameter 85 is "1", it can be disclosed (referred to) in communication based on a type B (type B defined in ISO/IEC14443) when the third parameter 85 is "2", and it can be disclosed (referred to) in communication based on a proprietary communication protocol when the third parameter 85 is "3".

Additionally, the fourth parameter 86 stores information indicative of a type of communication protocol that enables disclosure of each application program in response to access in communication using the third interface (USB). However, the fourth parameter 86 is substantially effective only when the setting in the second parameter 84 is "1" (i.e., disclosure is possible through the USB I/F).

According to the first to fourth parameters 83 to 86, whether each application program can be disclosed (referred to) in accordance with various kinds of interfaces or various kinds of communication protocols can be set. For instance, in the structural example depicted in FIG. 5, reference can be made to an application program having the first parameter 83 set to "1", the second parameter 84 set to "0", the third parameter 85 set to "2" and the fourth parameter 86 set to "0" only in communication using the contact I/F 55 as well as communication based on the type B communication protocol using the contactless I/F 56.

An example of the selecting function for the application programs installed in the IC card 10 will now be described.

Figure 6:
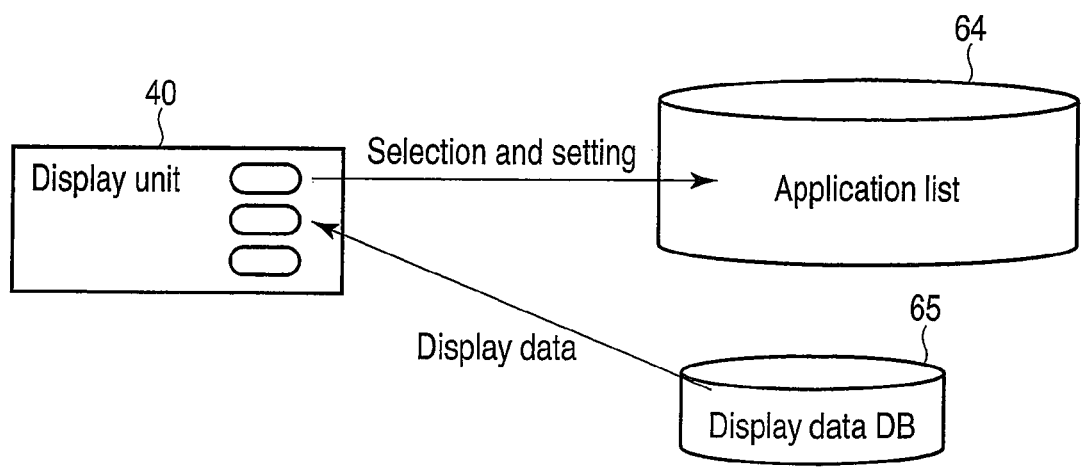
FIG. 6 is a view for explaining an example of selecting a contactless IC card application installed in the IC card by the mobile phone terminal side.

FIG. 6 is a view for explaining an example of selecting and setting a contactless IC card application installed in the IC card 10 by the mobile phone terminal 11 side.

In the mobile phone terminal baseband (the control unit) 20, the control unit 31 acquires the application list showing a list of contactless IC applications from the IC card 10. Furthermore, when there is display data associated with each application ID in the acquired application list 64, the control unit 31 obtains the display data from the IC card 10. That is, as shown in FIG. 6, when there is the display data associated with each application ID, the display data indicative of each application is displayed in the display unit 40 by acquiring the display data associated with each application.

Moreover, each application may be assigned to a key (not shown) provided in the mobile phone terminal 11, for example. It may be selected by a user. For example, a plurality of keys in each keyboard may be assigned (respective keys "*", "0" and "#" may be assigned to respective services X, Y and Z, for example) to a plurality of services realized by the plurality of contactless IC card applications. In this case, when a user presses a corresponding key, the contactless IC card application that realizes each service X, Y or Z is selected. Additionally, each parameter in the contactless IC card application associated with a key selected by the user can be set.

It is to be noted that the display data DB 65 is installed in the secure IC card 10. Therefore, security of display data itself can be assured even though the display data itself such as a pattern (a logo) representing an application (or service contents realized by an application) requires security properties. Further, each display data in the display data DB 65 can be maintained from the mobile phone terminal 11. For example, the mobile phone terminal 11 can appropriately update display data in accordance with supply from an operator's system.

A setting method for the application list 64 will now be described.

Figure 7:
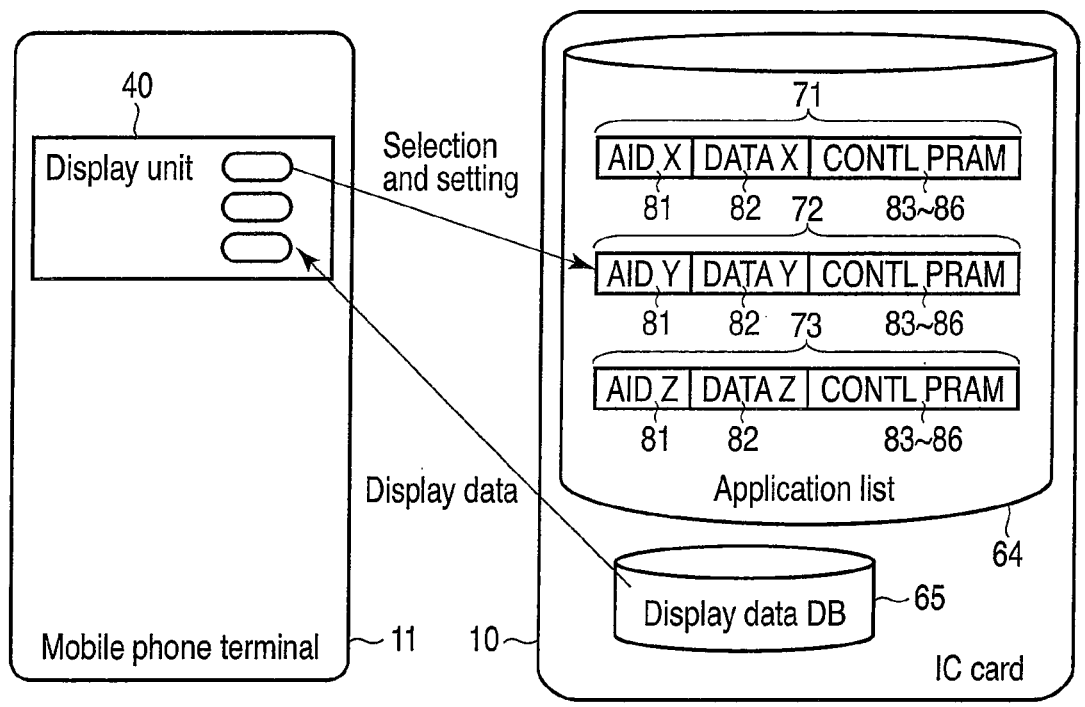
FIG. 7 is a view for explaining a setting method for the application list.

FIG. 7 is a view for explaining the setting method for the application list 64.

FIG. 7 schematically shows a procedure of updating the setting concerning an application that can be selected based on display data as an example of the setting method for the application list 64.

Here, it is assumed that the display unit 40 of the mobile phone terminal 11 displays a plurality of pieces of display data representing respective types of services realized by various kinds of applications. In this state, a user selects display data indicative of a desired service from the plurality of pieces of display data associated with respective services displayed in the display unit 40. Then, the control unit 31 of the mobile phone terminal 11 supplies information indicative of an application associated with the display data selected by the user and an update request for the application list 64 to the IC card 10.

Then, the control unit 51 of the IC card 10 specifies an application ID associated with the display data that has been requested to be updated. Upon specifying the application ID associated with the update request, the control unit 51 of the IC card 10 selects a data string associated with the application ID from the application list 64. For example, when the user selects an application (AID Y) of the data string 72, the control unit 51 updates the setting of the data string 72 in the application list 64. The respective parameters 83 to 86 can be updated by using the keyboard of the mobile phone 11.

That is, when the user selects the application (AID Y) of the data string 72, the control unit 51 can update the application 63b of "AID Y" to setting contents that enable access using the contactless interface 56 in the data string 72 in the application list 64. For example, in the structural example depicted in FIG. 5, updating the first parameter 83 in the data string 72 to "1" enables disclosing the application of "10000002" by using the contactless interface 56.

It is to be noted that, to enable accessing an application selected by the user through the contactless I/F 56, the setting that prevents each application from being disclosed through the contactless interface 56 is configured in initial values of each data string 72 in the application list 64. That is, disabling disclosure of each application through the contactless interface 56 as the initial setting enables updating the setting so that an application selected by the user alone can be disclosed through the contactless interface 56.

Figure 8:
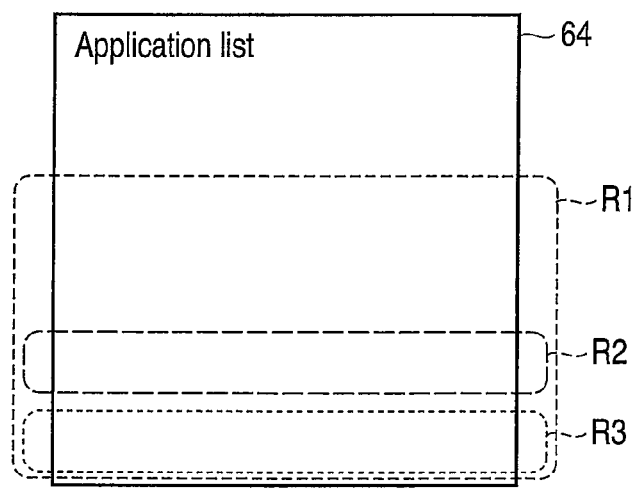
FIG. 8 is a view showing a setting example for a range (a region) of information that can be disclosed under various conditions in the application list.

Moreover, FIG. 8 is a view showing a setting example of a range (a region) of information which can be disclosed under various conditions in the application list 64.

The example in FIG. 8 schematically shows that an information group that can be disclosed under a first condition is a region R1, an information group that can be disclosed under a second condition is a region R2, and an information group that can be disclosed under a third condition is a region R3. For example, the application list 64 corresponds to such a structural example as depicted in FIG. 5, a combination of an interface and a communication protocol can be considered as the first to third conditions. It is assumed that the first condition is a combination of a contactless interface and all communication protocols, a second condition is a combination of a contactless interface and a type A communication protocol, and a third condition is a combination of a contactless interface and a type B communication protocol as specific examples. In this case, as shown in FIG. 8, the ranges (the regions) R1, R2 and R3 that store information indicative of application programs that can be disclosed (referred to) in accordance with the first, second and third conditions are set.

A flow of processing executed by an application program (a contactless IC card application) installed in this IC card 10 will now be described.

FIG. 9 is a flowchart for explaining a flow of processing executed by a contactless IC card application.

First, in the mobile phone terminal baseband (the control unit) 20, the control unit 31 requests the IC card 10 for the application list 64 (S11).

The IC card 10 disposed to the mobile phone terminal 11 receives the request for the application list 64 from the mobile phone terminal baseband (the control unit) 20 through the contact interface 55. Here, it is assumed that reference can be made to all application programs with respect to access from the contact interface 55. Therefore, the IC card 10 transmits the application list 64 showing all the installed applications to the mobile phone terminal baseband 20 through the contact interface 55 (S12).

Upon receiving the application list 64 from the IC card 10, the control unit 31 in the mobile phone terminal baseband requests the IC card 10 for display data associated with each application ID (AID) included in this application list 64 (S13).

The IC card 10 receives the request for the display data from the mobile phone terminal baseband (the control unit) 20 via the contact interface 55. Upon receiving this request, the control unit 51 of the IC card extracts the display data associated with each AID from the display data DB 65 and transmits the extracted display data of each AID to the mobile phone terminal baseband 20 via the contact interface 55 (S14).

Upon receiving the display data of each AID from the IC card 10, the control unit 31 of the mobile phone terminal baseband 20 executes processing of allowing the user to select a desired application program based on the display data (S15). That is, the control unit 31 displays the acquired display data in the display unit 40. For example, the control unit 31 displays such a display screen as depicted in FIG. 6 or 7 in the display unit 40. In a state that each display data associated with each application is displayed in the display screen in the display unit 40, the control unit 31 waits for the user to select specific display data by using the operation unit 41.

When the user selects specific display data by using the operation unit 41 in such a state, the control unit 31 sets a contactless IC card application associated with the display data selected by the user to be available in contactless communication. That is, the control unit 31 of the mobile phone terminal 11 requests the IC card 10 to change the setting of the application list 64 so that the contactless IC card application associated with the display data selected by the user can be disclosed through the contactless interface 56 (S16).

The IC card 10 receives the setting change request for the contactless IC card application associated with the specific display data from the mobile phone terminal baseband 20 via the contact interface 55. Upon receiving this request, the control unit 51 of the IC card 10 executes update processing for the application list (S17). This update processing is also setting a range (an application) that can be disclosed by using the contactless interface 56.

That is, the control unit 51 of the IC card 10 specifies a data string of the contactless IC card application associated with the display data selected by the user in the application list 64. When the data string of the contactless IC card application selected by the user is specified, the control unit 51 of the IC card 10 updates each parameter in the specified data string to a setting that enables disclosure using the contactless interface 56. For example, the control unit 51 updates a value of the first parameter 83 in the data string of the selected contactless IC card application to "1" with respect to the application list 64 corresponding to such a structural example as depicted in FIG. 5. As a result, the contactless IC card application selected by the user is disclosed with respect to access from the contactless interface 56.

Furthermore, in the application list 64 corresponding to the structural example depicted in FIG. 5, each communication protocol that enables disclosure can be also set. When setting each communication protocol that enables disclosure, the control unit 51 updates a value of the first parameter 83 in the data string of the selected contactless IC card application to "1" and also updates a value of the third parameter 85 to a value associated with a specified communication protocol. As a result, the contactless IC card application selected by the user is disclosed with respect to access from the contactless interface 56 only when the specified communication protocol is set.

Upon completion of the above-described setting, the control unit 51 of the IC card transmits a response indicative of completion of update of the application list 64 to the mobile phone terminal baseband 20 through the contact interface 55 (S18).

Based on the processing at the S11 to S18, the setting that enables use of a specified contactless IC card in accordance with the user's selection is completed.

In a state that the above-described setting has been finished, the IC card 10 disposed to the mobile phone terminal 11 can perform contactless communication through the contactless communication unit 21 and the antenna 22 in the mobile phone terminal 11 by using the contactless interface 56. In such a state, a request for the application list transmitted by the reader/writer 13 is received by the contactless communication unit 21 and the antenna 22 in the mobile phone terminal 11. The application list request received by the contactless communication unit 21 and the antenna 22 is received by the IC card 10 via the contactless interface 56.

That is, the IC card 10 receives the application list request from the reader/writer 13 through the antenna 22, the contactless communication unit 21 and the contactless interface 56. Upon receiving such a request, the control unit 51 of the IC card 10 extracts an application program that can be disclosed through the contactless interface 56 from the application list 64. It is to be noted that a communication protocol is not specified in particular in this example. Therefore, in the application list having the configuration depicted in FIG. 5, a data string having the first parameter 83 set to "1" is extracted as the application program that can be disclosed through the contactless interface 56.

Upon extracting the application program that can be disclosed via the contactless interface 56, the control unit 51 of the IC card 10 generates an application list in which each extracted application program is listed up. When the list including each extracted application program that can be disclosed is generated, the control unit 51 of the IC card 10 transmits the generated list to the reader/writer 13 through the contactless interface 56 by using the contactless communication unit 21 and the antenna 22 in the mobile phone terminal 11 (S22).

The reader/writer 13 that has received the application list from the IC card 10 determines one application program that should be used from the application programs included in the received list. To facilitate determination of the application program that should be used in the reader/writer 13, parameters indicative of a priority order may be added to the respective data strings 71 to 73. Moreover, a data string of an application program having a high priority may be written at a higher position in the application list 64. When the application program that should be used is determined, the reader/writer 13 transmits a selection request for the application program to the IC card 10 (S23).

The IC card 10 receives the selection request for the application program from the reader/writer 13 through the antenna 22, the contactless communication unit 21 and the contactless interface 56. Upon receiving such a request, the control unit 51 of the IC card 10 executes selection processing for the selected application program. In the selection processing for the application program, the control unit 51 of the IC card 10 activates the selected application program to enable execution of a service as the contactless IC card based on this application program. When such selection processing for the application is completed, the control unit 51 of the IC card 10 transmits a response indicative of completion of selection of the application program to the reader/writer 13 through the contactless interface 56 by using the contactless communication unit 21 and the antenna 22 in the mobile phone terminal 11 (S24).

Based on the processing at the S21 to S24, the processing based on the application program (the contactless IC card application) selected by the reader/writer 13 can be executed. In this state, the IC card 10 and the reader/writer 13 carry out contactless communication through the antenna 22, the contactless communication unit 21 and the contactless interface 56 to execute the processing (the service) provided by the application program (the contactless IC card application) (S25).

It is to be noted that, when the number of application program that can be disclosed through the contactless interface 56 is one, the IC card 10 may select this application program (the only application program that can be disclosed through the contactless interface 56) in response to a request for the application list from the reader/writer 13 and may return a selection result to the reader/writer 13. In this case, processing such as an application selection request following the list request is omitted.

According to the foregoing embodiment, in the mobile phone terminal used with the IC card like a USIM being inserted thereto, a contactless IC cared application selected by a user from the plurality of contactless IC card applications installed in the IC card on the mobile phone terminal side alone is set to be responsive with respect to actual contactless communication. When an access request is received from the reader/writer 13 in the contactless communication with such a setting being configured, the IC card 10 notifies the reader/writer 13 of the contactless IC card application selected by the user alone as an available contactless IC card application.

As a result, since the reader/writer 13 does not receive contactless IC card applications that are not selected by the user as a list, the contactless IC card application to be used can be selected from the contactless IC card applications previously selected by the user through the mobile phone terminal. That is, a process of selecting the contactless IC card application that is actually utilized by the reader/writer 13 from the contactless IC card applications selected by the user in advance can be simplified, and the service provided by the contactless IC card application adapted to the user's request can be rapidly and efficiently realized.

The IC card 10 is disposed to the mobile phone terminal 11 including the contactless communication unit 21. The IC card 10 has the contact interface 55 required to perform communication with the mobile phone terminal 11 and the contactless interface 56 used for the contactless communication unit 21 provided in the mobile phone terminal 11 to perform contactless communication. The IC card 10 stores a plurality of contactless programs that perform processing using the contactless interface 56 in advance, sets an application program that can execute processing using the contactless interface 56 in the stored application programs, and supplies to the reader/writer 13 a response that the set application program that can execute the processing using the contactless interface 56 alone is an available application program when an access request from the reader/writer 13 is received through the contactless interface 56.

According to the IC card 10, the process of selecting the contactless IC card application meeting conditions for implementation from the plurality of contactless IC card applications can be simplified, thereby rapidly and efficiently realizing the service provided by the contactless IC card application adapted to the user's request.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card that is coupled to a portable terminal device, the IC card comprising:
   a first interface which performs communication with the portable terminal device;
   a second interface which performs contactless communication with an external device by using a contactless communication unit of the portable terminal device;
   a storage unit which stores a plurality of application programs that execute processing during the contactless communication;
   a holding unit which holds an application list including setting information for each application program, wherein the setting information has an initial value indicating whether disclosure responsive to an access request via the second interface is permitted, the initial value being set to inhibit disclosure;
   an updating unit which updates the setting information of an application program to be permitted to be disclosed in response to a setting change request received from the portable terminal device via the first interface, the setting change request including information indicating that the application program is permitted to be disclosed; and
   a processing unit which responds to the information of the setting change request indicating that an application program is permitted to be disclosed, by enabling disclosure of the application program via the second interface, wherein in response to the access request through the contactless communication, permitted applications from the application list are automatically transmitted to the external device.

2. The IC card according to claim 1, wherein the application list is disabled to respond to the access request through the second interface as an initial value of a data string comprising the setting information associated with each application program.

3. The IC card according to claim 1, wherein a setting unit further enables a communication protocol to respond to the application programs stored in the storage unit, and
   the processing unit has a configuration that the application programs respond to an access request based on the communication protocol enabled to respond by the setting unit alone.

4. A portable terminal system comprising a portable terminal device and an IC card,
   the portable terminal device comprising:
      an IC card interface to which the IC card is disposed;
      a control unit which performs data communication with the IC card through the IC card interface; and
      a contactless communication unit which is coupled with the IC card through the IC card interface and performs contactless communication with an external device, and
   the IC card comprising:
      a first interface which is configured to perform communication with a control unit of the portable terminal device;
      a second interface which is configured to achieve connection with the contactless communication unit;

a storage unit which stores a plurality of application programs that perform processing during the contactless communication;

a holding unit which holds an application list including setting information for each application program, wherein the setting information has an initial value indicating whether disclosure responsive to an access request via the second interface is permitted, the initial value being set to inhibit disclosure;

an updating unit which updates the setting information of an application program to be permitted to be disclosed in response to a setting change request received from the portable terminal device via the first interface, the setting change request including information indicating that the application program is permitted to be disclosed; and a processing unit which responds to the information of the setting change request indicating that an application program is permitted to be disclosed, by enabling disclosure of the application program via the second interface, wherein in response to the access request through the contactless communication, permitted applications from the application list are automatically transmitted to the external device.

5. The system according to claim 4, wherein the portable terminal device further comprises an operation unit by which a user selects the application program enabled to respond to the access request through the second interlace in the application programs stored in the storage unit of the IC card, the control unit of the portable terminal device transmits to the IC card a request for enabling the application program selected by the operation unit to respond to the access request in the contactless communication, and a setting unit of the IC card enables the application program requested to be set by the portable terminal device to respond to the access request through the second interface.

6. The IC card according to claim 1, further comprising a transmission unit which transmits a list of application programs enabled by a setting unit to respond to the access request in the contactless communication, in a case where the list is requested.

7. The IC card according to claim 6, wherein in the case where the list of application programs is requested, if the list of application programs includes only one accessible application program, the processing unit activates the one application program.

8. The system according to claim 4, further comprising a transmission unit which transmits a list of application programs enabled by the setting unit to respond to the access request in the contactless communication, in a case where the list is requested.

9. The system according to claim 8, wherein in the case where the list of application programs is requested, if the list of application programs includes only one accessible application program, the processing unit activates the one application programs.

* * * * *